Nov. 18, 1930.  W. L. SCRIBNER  1,781,886
SELF ALIGNING ROLLER BEARING
Filed March 15, 1929
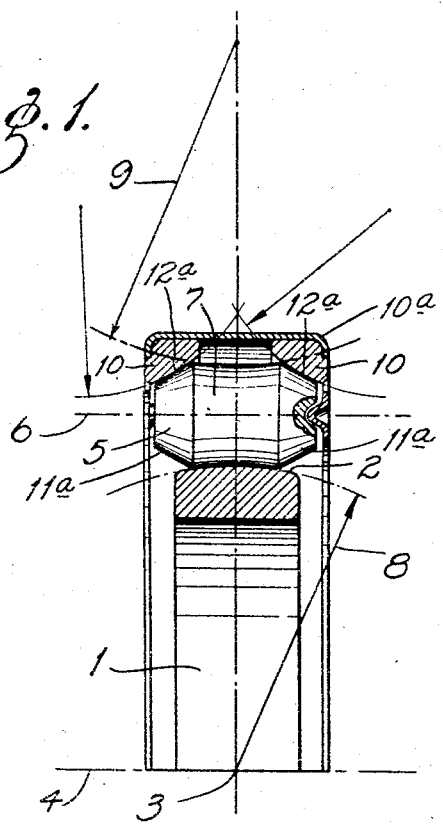
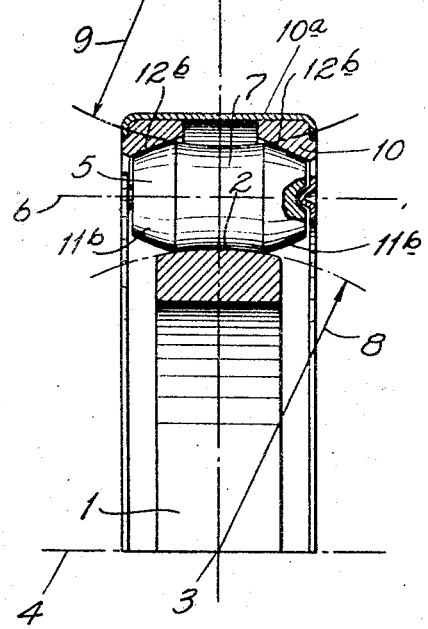
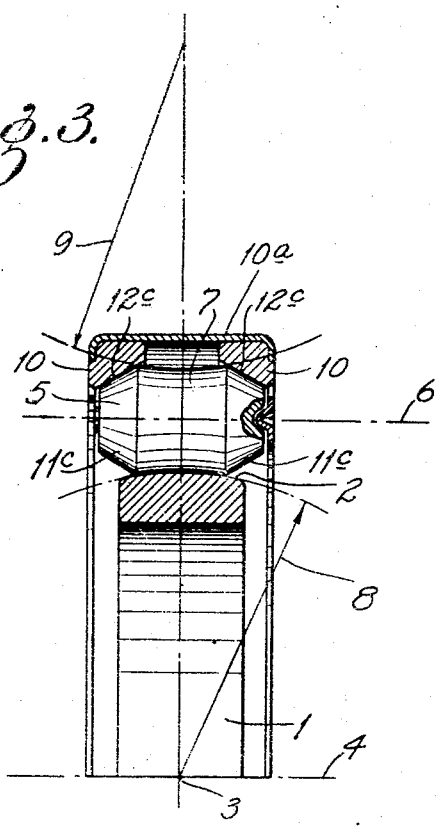
INVENTOR:
William L. Scribner,
by Carr Carr & Gravely,
HIS ATTORNEYS Patented Nov. 18, 1930

1,781,886

UNITED STATES PATENT OFFICE

WILLIAM L. SCRIBNER, OF CANTON, OHIO, ASSIGNOR TO THE TIMKEN ROLLER BEARING COMPANY, OF CANTON, OHIO, A CORPORATION OF OHIO

SELF-ALIGNING ROLLER BEARING

Application filed March 15, 1929. Serial No. 347,209.

My invention relates to self-aligning roller bearings and has for its principal object a single row self-contained roller bearing of the self-aligning type. The invention consists in the bearing and in the parts and combinations and arrangements of parts hereinafter described and claimed.

In the accompanying drawing,

Fig. 1 is a longitudinal sectional view of a bearing embodying my invention; and Figs. 2 and 3 are similar views of slight modifications.

An inner bearing member 1 has its bearing surface 2 convexly curved endwise, that is, axially of the bearing, the center of curvature 3 thereof being on the axis 4 of the bearing. Mounted on said inner bearing member is a circular series of bearing rollers 5 disposed with their axes 6 parallel with the axis 4 of the bearing and having their body portions 7 concavely curved lengthwise to cooperate with the inner bearing member. The radius of curvature 8 of the inner bearing member is less than the radius of curvature 9 of the middle portion of the bearing rollers, so that said rollers have limited or so-called point contact at their middles with said inner bearing member.

The ends of the rollers 5 are of tapering form to cooperate with cup or outer bearing members 10 that have tapering bores. Said cup members are held in assembly by means of a ring 10$^a$ whose sides are bent over the edges of said cup members.

In the construction shown in Fig. 1, the ends 11$^a$ of said rollers are conical and the cup members that cooperate therewith have convexly curved raceways 12$^a$ so as to have limited or point contact at about the middle of the conical end portions of the rollers.

In the construction shown in Fig. 2, the end portions 11$^b$ of the bearing rollers are tapering, but have a convex curvature lengthwise, and the raceway 12$^b$ of each cup member is a conical surface; which construction likewise, gives the end portions of the rollers limited or point contact with said cup members.

In the construction shown in Fig. 3, the end portions 11$^c$ of the rollers are conical and the raceways 12$^c$ of the cup members are also conical, giving line contact between the cup members and said end portions of said rollers.

The above described bearing is self-aligning, permitting limited movement as between the rollers and the inner bearing member; and the rollers are also self-righting by reason of the engagement of said cup members and the ends of said rollers.

What I claim is:

1. A roller bearing comprising an annular inner bearing member convexly curved lengthwise, a circular series of bearing rollers thereon having their axes parallel with the axis of the bearing and having their body portions concavely curved to cooperate with said inner bearing member, and cup members having tapering bores constituting outer raceways, said rollers having tapering end portions to cooperate therewith.

2. A roller bearing comprising an annular inner bearing member convexly curved lengthwise, a circular series of bearing rollers thereon having their axes parallel with the axis of the bearing and having their body portions concavely curved to cooperate with said inner bearing member, the radius of curvature of said inner bearing member being less than that of said rollers, and cup members having tapering bores constituting outer raceways, said rollers having tapering end portions to cooperate therewith.

3. A roller bearing comprising an annular inner bearing member convexly curved lengthwise, a circular series of bearing rollers thereon having their axes parallel with the axis of the bearing and having their body portions concavely curved to cooperate with said inner bearing member and cup members having tapering bores constituting outer raceways, said rollers having tapering end portions to cooperate therewith, one of said tapering portions being conical and the other having a convex curvature.

4. A roller bearing comprising an annular inner bearing member convexly curved lengthwise, a circular series of bearing rollers thereon having their axes parallel with the axis of the bearing and having their body portions concavely curved to cooperate with said inner bearing member and cup members having tapering bores constituting outer raceways, said rollers having tapering end portions to cooperate therewith, the tapering end portions of the rollers being conical and said cup members being convexly curved.

Signed at Canton, Ohio, this 12th day of March, 1929.

WILLIAM L. SCRIBNER.